US008722264B2

(12) United States Patent
Ganapathy et al.

(10) Patent No.: US 8,722,264 B2
(45) Date of Patent: May 13, 2014

(54) ALGORITHM FOR STACK CURRENT CONTROLLER BASED ON POLARIZATION CURVE ESTIMATION OF A FUEL CELL STACK

(75) Inventors: Sriram Ganapathy, Rochester, NY (US); Kiran Mallavarapu, Honeoye Falls, NY (US); Balasubramanian Lakshmanan, Pittsford, NY (US); John P. Salvador, Penfield, NY (US); Frank X. Leo, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1306 days.

(21) Appl. No.: 12/027,063

(22) Filed: Feb. 6, 2008

(65) Prior Publication Data

US 2009/0197127 A1    Aug. 6, 2009

(51) Int. Cl.
*H01M 8/04*        (2006.01)
(52) U.S. Cl.
USPC ............................. 429/431; 429/430; 429/432
(58) Field of Classification Search
USPC .................................. 429/13, 430, 431, 432
See application file for complete search history.

(56) References Cited

U.S. PATENT DOCUMENTS

| 7,569,293 B1 * | 8/2009 | Cross, III | 429/13 |
| 2006/0051628 A1 * | 3/2006 | Lim et al. | 429/13 |

OTHER PUBLICATIONS

Gorgun et al., An algorithm for estimation of membrane water content in PEM fuel cells, Jun. 2006, Journal of Power Sources, 157, 389-394.*
Lauzze et al., Power Control of a Polymer Electrolyte Membrane Fuel Cell, May 2006, Ind. Eng. Chem. Res., 45, 4661-4670.*
Chapra, S., Applied Numerical Methods with MATLAB for Engineers and Scientists, Jun. 2004, McGraw-Hill Science, 1, 81-100.*
Mohamed et al., Proton exchange membrane (PEM) fuel cell stack configuration using genetic algorithms, Jan. 2004, Journal of Power Sources, 131, 142-146.*

* cited by examiner

*Primary Examiner* — Sean P Cullen
(74) *Attorney, Agent, or Firm* — John A. Miller; Miller IP Group, PLC

(57) ABSTRACT

A method for providing a current density set-point for a fuel cell stack in response to a power request from the stack where the set-point is determined based on system parameters that identify the life and degradation of the stack. The method includes dividing a current density range of the fuel cell stack into a predetermined number of sample regions, and selecting the sample regions in order from low to high during the current set-point analysis. The method calculates an average cell voltage for the current density of the selected sample region, and stack power from the average cell voltage. The method then determines whether a power request signal is less than the stack power for the selected sample region and greater than the calculated power for the previous sample region, and if so, calculates the current density set-point at the requested power based on these values.

19 Claims, 3 Drawing Sheets

ALGORITHM FOR STACK CURRENT CONTROLLER BASED ON POLARIZATION CURVE ESTIMATION OF A FUEL CELL STACK

BACKGROUND OF THE INVENTION

1. Field of the Invention

This invention relates generally to a system and method for identifying a current density set-point of a fuel cell stack in response to a power request from the stack and, more particularly, to a system and method for providing a current density set-point for a fuel cell stack in response to a power request from the stack where the current density set-point is determined based on stack parameters that identify the performance and degradation of the stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The stack controller needs to know the current/voltage relationship, referred to as a polarization curve, of the fuel cell stack to provide a proper distribution of power from the stack. The relationship between the voltage and the current of the stack is typically difficult to define because it is non-linear, and changes depending on many variables, including stack temperature, stack partial pressures and cathode and anode stoichiometries. Additionally the relationship between the stack current and voltage changes as the stack degrades over time. Particularly, an older stack will have lower cell voltages, and will need to provide more current to meet the power demands than a new, non-degraded stack.

Fortunately, many fuel cell systems, once they are above a certain temperature, tend to have repeatable operating conditions at a given current density. In those instances, the voltage can be approximately described as a function of stack current density and age.

SUMMARY OF THE INVENTION

In accordance with the teachings of the present invention, a system and method are disclosed for providing a current density set-point for a fuel cell stack in response to a power request from the stack where the set-point is determined based on system parameters that identify the life and degradation of the stack. The method includes dividing a current density range of the fuel cell stack into a predetermined number of sample regions, and selecting the sample regions in order from low to high during the current density set-point analysis. The method calculates an average cell voltage for the current density of the selected sample region, and stack power from the average cell voltage. The method then determines whether a power request signal is less than the stack power for the selected sample region and greater than the calculated power for the previous sample region, and if not, moves to the next sample region to calculate the average cell voltage and the stack power. If the power request signal is less than the stack power for the selected sample region and greater than the power request signal for the previous sample region, then the method calculates the current density set-point at the requested power based on these values.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining a current density set-point of a fuel cell stack for a power request from the stack that considers stack life and degradation is merely exemplary in nature and is in no way intended to limit the invention or its applications or uses.

Many control parameters of a fuel cell system require knowledge of the polarization curve of the fuel cell stack, such as knowing the maximum voltage potential and current draw available from the fuel cell stack. As mentioned above, as the stack ages, the stack polarization curve also changes as a result of stack degradation. U.S. patent application Ser. No. 11/669,898, filed Jan. 31, 2007, titled Algorithm for Online Adaptive Polarization Curve Estimation of a Fuel Cell Stack, assigned to the Assignee of this Application and herein incorporated by reference, discloses an algorithm for calculating the polarization curve of a fuel cell stack online as the fuel cell system is being operated. The algorithm of the '898 application estimates two or more stack parameters from collected data as the stack is being operated, and uses the parameters to calculate the polarization curve. When the fuel cell stack is running and certain data validity criteria have been met, the algorithm goes into a good collection mode where it collects stack data, such as stack current density, average cell voltage and minimum cell voltage. When the stack is shut-down, the algorithm uses a cell voltage model to solve a non-linear least squares problem to estimate predetermined parameters that define the polarization curve. If the estimated parameters satisfy certain termination criteria, then the estimated parameters are stored to be used by a system controller to calculate the polarization curve of the stack for future stack runs.

Figure 1:
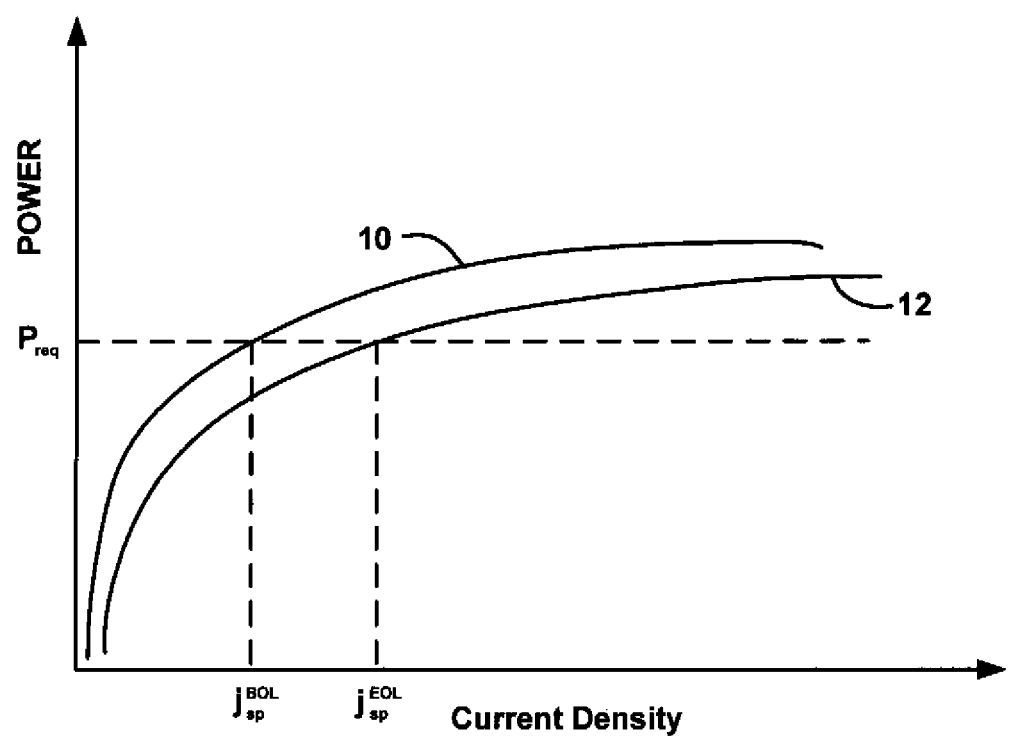
FIG. 1 is a graph with current density on the horizontal axis and power on the vertical axis showing the relationship of a requested power signal to a current density set-point that depends on the life of the fuel cell stack.

The present invention proposes a system and method that provides a current density set-point for a power request from a fuel cell stack that defines the current density available from the stack at a certain point in time by considering system parameters that identify stack degradation over the life of the stack. FIG. 1 is a graph with current density on the horizontal axis and voltage on the vertical axis that shows a voltage/current polarization curve, identified by graph line 10, for the relationship between stack power and current density at the beginning of life of the stack, and a polarization curve, identified by graph line 12, for the relationship between stack power and current density for a stack at the end of the life of the stack. For a particular power request signal $P_{req}$ from the stack, an algorithm of the invention will identify the current density available from the stack, represented here by a current density set-point $j_{sp}^{BoL}$ at the stack beginning of life (BoL) and a current density set-point $j_{sp}^{EoL}$ at the stack end of life (EoL).

Figure 2:
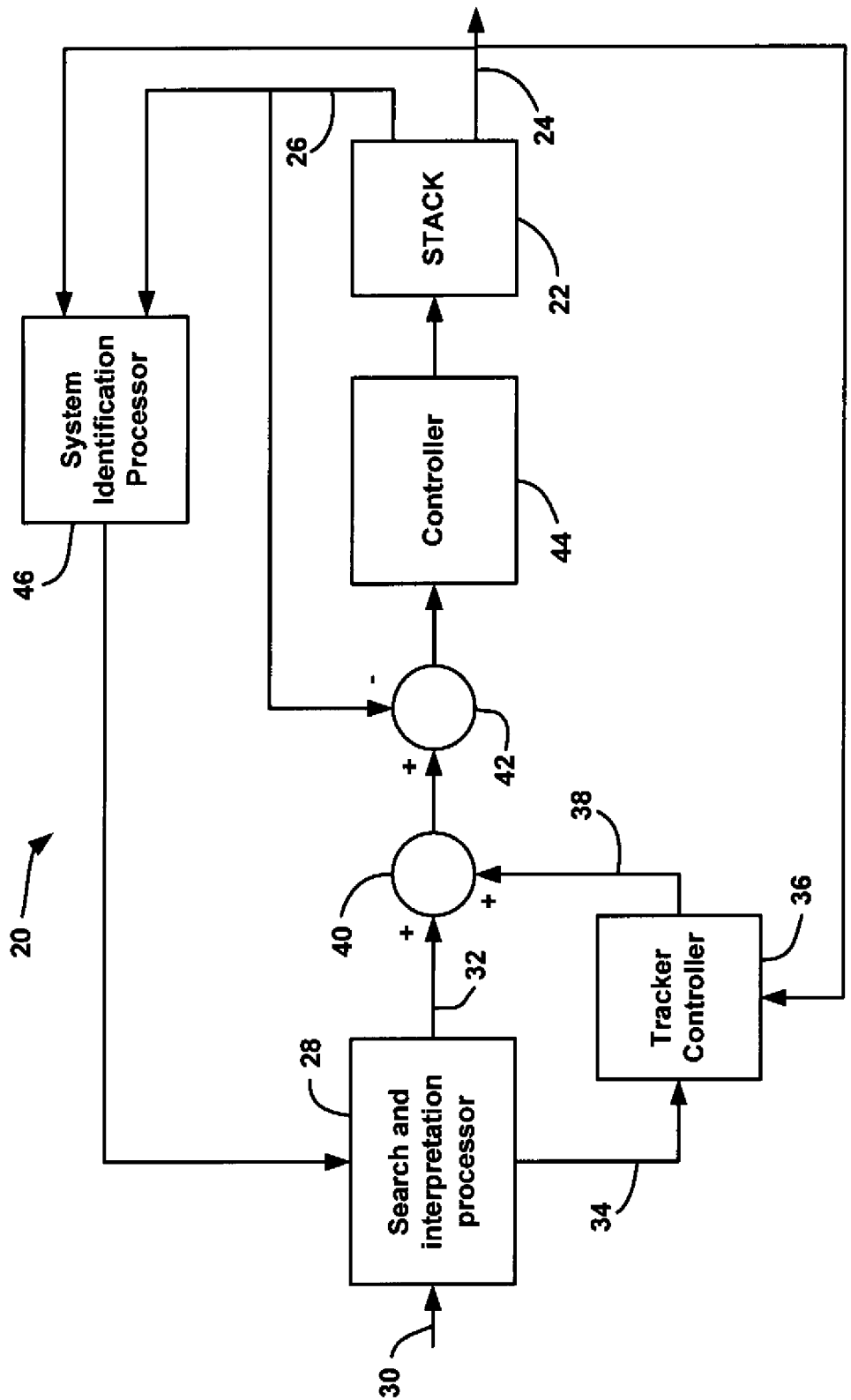
FIG. 2 is a block diagram of a fuel cell system employing an algorithm for determining the current density set-point of the fuel cell stack based on a power request signal, according to an embodiment of the present invention.

FIG. 2 is a block diagram of a fuel cell system 20 including a fuel cell stack 22. A voltage output signal V from the stack 22 is provided on line 24 and a current density output signal j from the stack 22 is provided on line 26. A power request signal $P_{req}$ that represents a power request from the stack 22 is provided to a search and interpretation processor 28 on line 30. As will be discussed in detail below, the processor 28 converts the power request signal $P_{req}$ to a current request signal $I_{req}$ on line 32 and a voltage request signal $V_{req}$ on line 34, where the current request signal $I_{req}$ identifies the current available from the stack 22 as it ages. The voltage request signal $V_{req}$ from the processor 28 and the voltage signal V from the stack 22 are provided to a tracker controller 36 that provides a difference between the voltage request signal $V_{req}$ and the stack voltage signal V and generates a modified current signal $I_{mod}$ provided on line 38. If voltage degradation improves during a stack run, the tracker controller 36 moves the current command signal $I_{cmd}$ to meet the power request signal $P_{req}$ by changing the current modification signal $I_{mod}$.

The current request signal $I_{req}$ and the modified current signal $I_{mod}$ are sent to an adder 40 that adds the current signals to provide a current command signal $I_{cmd}$. The current signal j from the stack 22 is subtracted from the current command signal $I_{cmd}$ by a subtractor 42 and a current error signal is provided to a system controller 44. The system controller 44 uses the current error signal to determine the proper reactant flows to the stack 22 to set the current output of the stack 22 at a desirable location. The controller 44 can be any suitable controller for the purposes discussed herein, such as a proportional-integral (PI) controller.

The current density signal j and the voltage signal V from the stack 22 are also sent to a system identification processor 46 that determines system parameters, such as average cell voltage and minimum cell voltage, and provides a polarization curve estimation that determines the degradation of the stack 22 over its life. These values are provided to the processor 28 to set the current request signal $I_{req}$ and the voltage request signal $V_{req}$. The system identification processor 46 can use any process suitable to determine the polarization curves used by the algorithm discussed herein, such as the process disclosed in the '898 application.

Figure 3:
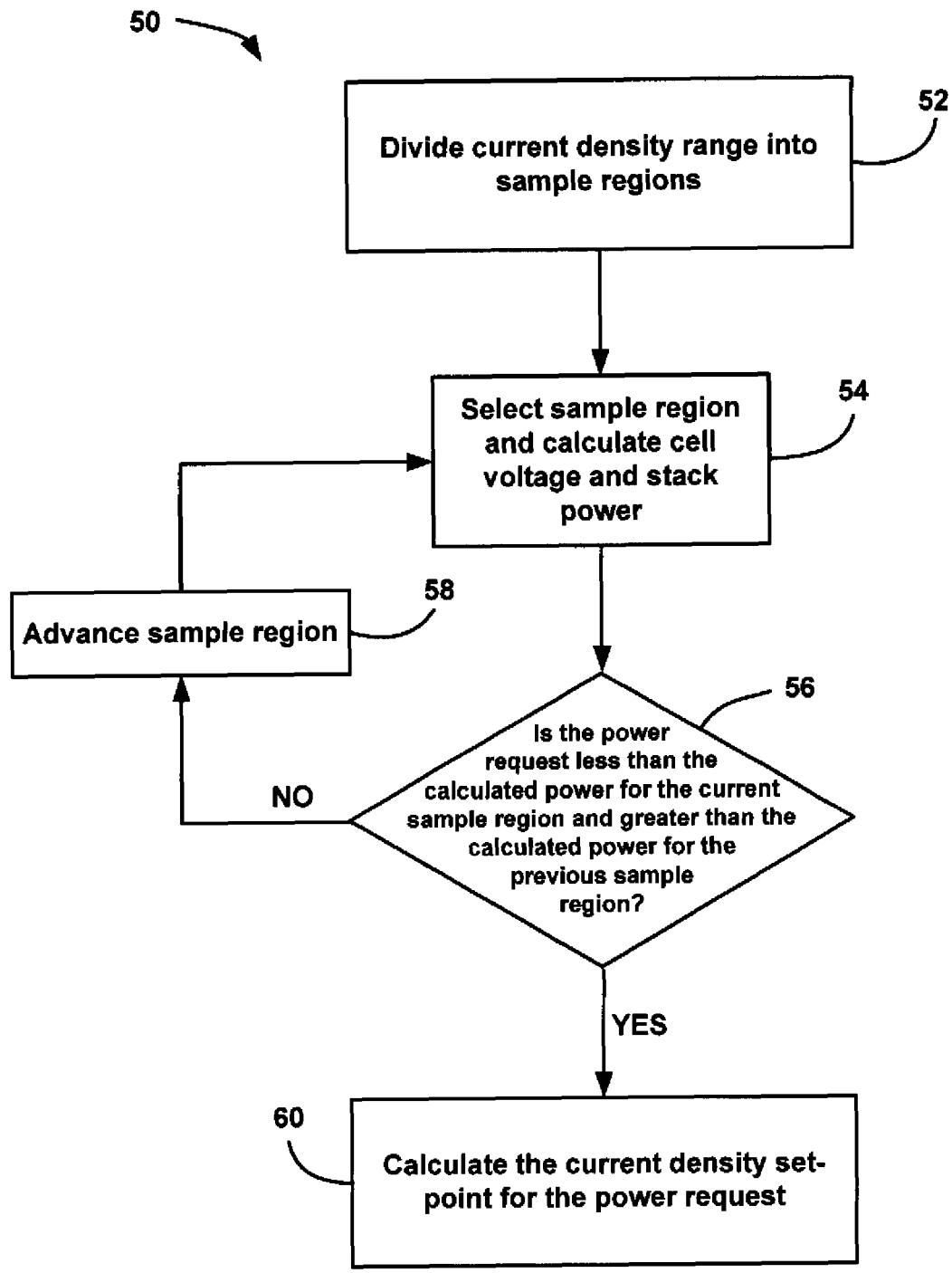
FIG. 3 is a flow chart diagram showing a process for determining the current density set-point, according to an embodiment of the present invention.

FIG. 3 is a flow chart diagram 50 showing an algorithm for how the processor 28 determines the current request signal $I_{req}$ based on the estimated polarization curve and system parameters, according to an embodiment of the present invention. The process starts at the far left of the polarization curve 10 or 12 depending on whether the stack 22 is at its beginning or end of life, and moves down along the curve 10 or 12 until the current density set-point $j_{sp}^{BoL}$ or $j_{sp}^{EoL}$ is reached for the particular power request signal $P_{req}$.

At box 52, the algorithm divides the current density range of the stack 22 into N sample regions, where k identifies the specific sample region being analyzed. In one non-limiting example, the current density range can be 0.1-2.0 A/cm² and the sample regions can be every 0.1 A/cm². The algorithm then obtains a current density j for the selected sample region, and calculates an average cell voltage $E_{cell}$ at that current density j using the polarization curve estimates from the processor 46 at box 54. Alternately, a minimum cell voltage can be calculated. In one non-limiting example, the average cell voltage $E_{cell}$ at the specific current density j is calculated as:

$$E_{cell} = E_{rev} - (j + a) * R_{HFR} - \left(0.07 * \log_{10}\left(\frac{j+a}{j^0}\right) + c\log_{10}\left(1 - \frac{j}{j^\infty}\right)\right)$$

Where,
 $E_{cell}$ is the cell voltage (V),
 j is the current density (A/cm²),
 $R_{HFR}$ is the cell HFR resistance (ohm cm²),
 $E_{rev}$ is the thermodynamic reversible cell potential (V),
 α is the background current density from cell shorting/cell crossover (A/cm²),
 $j^0$ is the exchange current density (A/cm²),
 $j^\infty$ is the limiting current density (A/cm²), and
 c is the mass transfer coefficient.

The algorithm also calculates the gross power P(j) at that current density j at the box 54 using the equation:

$$P(j) = (E_{cell} * N_{cells} * j * A_{cells})$$

Where $N_{cells}$ is the number of cells and $A_{cell}$ is the area of each cell.

The algorithm then determines whether the power request signal $P_{req}$ is less than the calculated gross power P(j) at that current density sample region and whether the power request signal $P_{req}$ is greater than the calculated gross power for the previous current density sample region at decision diamond 56. If both of these conditions are not met, then the algorithm increments the sample region to the next sample region at box 58, and then calculates the new average cell voltage $E_{cell}$ and gross power P(j) at the box 54.

If both of these conditions are met at the decision diamond 56, then the algorithm calculates the difference between the current density at the selected sample region and the previous sample region, calculates the difference between the calculated power for the selected sample region and the previous sample region, and then use these values to determine the current density set-point $j_{sp}$ for the request power signal $P_{req}$ at box 60. These calculations can be made by the following equations. The current density set-point $j_{sp}$ is a feed-forward term rather than a reactive term, thus reducing system perturbations and oscillations.

$$\Delta j = j_a[k] - j_a[k-1]$$

$$\Delta P = P(j_a[k]) - P(j_a[k-1])$$

$$j_{sp} = j_a[k-1] + \left(\frac{\Delta j}{\Delta P}(P_{req} - P(j_a[k-1]))\right)$$

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a current density set-point for a fuel cell stack in response to a power request signal from the stack, said method comprising:
providing a processor and control system programmed for:
estimating a polarization curve of the fuel cell stack based on system parameters;
separating a current density range of the fuel cell stack into a predetermined number of sample regions;
selecting a first sample region;
determining a cell voltage at the current density where the selected sample region using the estimated polarization curve;
determining stack power using the cell voltage; and
determining the current density set-point for the power request signal at the selected sample region by analyzing stack power at the selected sample region and a previous sample region.

2. The method according to claim 1 wherein determining the current density set-point includes using the difference between the current density for the selected sample region and the previous sample region and the difference between the power for the current density sample region and the previous sample region.

3. The method according to claim 1 wherein selecting a next sample region in the current density range includes selecting the next sample region in order from a low current density in the range to a high current density in the range.

4. The method according to claim 1 wherein estimating a polarization curve of the fuel cell stack using system parameters includes using different polarization curves depending on the life of the stack.

5. A method for determining a current density set-point for a fuel cell stack in response to a power request signal from the stack, said method comprising:
providing a processor and control system programmed for:
separating a current density range of the fuel cell stack into a predetermined number of sample regions;
selecting a first sample region;
determining a cell voltage at the current density for the selected sample region;
determining stack power using the cell voltage;
determining whether the power request signal is less than the stack power for the selected sample region;
determining whether the power request signal is greater than a stack power calculated from a previous sample region;
selecting a next sample region in the current density range if the power request signal is not less than the stack power for the selected sample region and not greater than the stack power for the previous sample region; and
calculating the current density set-point for the power request signal at the selected sample region if the power request signal is less than the stack power for the selected sample region and is greater than the stack power for the previous sample region.

6. The method according to claim 5 wherein determining the current density set-point includes using the difference between the current density for the selected sample region and the previous sample region and the difference between the power for the selected density sample region and the previous current density sample region.

7. The method according to claim 6 wherein determining the current density set-point includes using the equations:

$$\Delta j = j_a[k] - j_a[k-1]$$

$$\Delta P = P(j_a[k]) - P(j_a[k-1])$$

$$j_{sp} = j_a[k-1] + \left(\frac{\Delta j}{\Delta P}(P_{req} - P(j_a[k-1]))\right)$$

where j is the current density, k is the sample region and P is the power.

8. The method according to claim 5 wherein determining a cell voltage includes determining an average cell voltage in the stack.

9. The method according to claim 8 wherein determining an average cell voltage includes using the equation:

$$E_{cell} = E_{rev} - (j+a) * R_{HFR} - \left(0.07 * \log_{10}\left(\frac{j+a}{j^0}\right) + c\log_{10}\left(1 - \frac{j}{j^\infty}\right)\right)$$

where $E_{cell}$ is the cell voltage, j is the current density, $R_{HFR}$ is the cell HFR resistance, $E_{rev}$ is the thermodynamic reversible cell potential, α is the background current density from cell shorting/cell crossover, $j^0$ is the exchange current density, $j^\infty$ is the limiting current density and c is the mass transfer coefficient.

10. The method according to claim 5 wherein determining a cell voltage at the current density from the selected sample region includes using system parameters that depend on the life of the stack.

11. A method for determining a current density set-point for a fuel cell stack in response to a power request signal from the stack, said method comprising:
providing a processor and control system programmed for:
estimating a polarization curve of the fuel cell stack based on system parameters;
separating a current density range of the fuel cell stack into a predetermined number of sample regions;
selecting a first sample region;
determining a cell voltage at the current density for the selected sample region using the estimated polarization curve;
determining stack power using the cell voltage;
determining whether the power request signal is less than the stack power for the selected sample region;
determining whether the power request signal is greater than a stack power calculated from a previous sample region;
selecting a next sample region in the current density range if the power request signal is not less than the stack power for the selected sample region and not greater than the stack power for the previous sample region; and determining the current density set-point for the power request signal at the current sample region if the power request signal is less than the stack power for the selected sample region and is greater than the stack power for the previous sample region.

12. The method according to claim 11 wherein estimating a polarization curve of the fuel cell stack using system parameters include using an average cell voltage and a minimum cell voltage.

13. The method according to claim 11 wherein determining the current density set-point includes using the difference between the current density for the selected sample region and the previous sample region and the difference between the power for the current density sample region and the previous current density sample region.

14. The method according to claim 13 wherein determining the current density set-point includes using the equations:

$$\Delta j = j_a[k] - j_a[k-1]$$
$$\Delta P = P(j_a[k]) - P(j_a[k-1])$$
$$j_{sp} = j_a[k-1] + \left(\frac{\Delta j}{\Delta P}(P_{req} - P(j_a[k-1]))\right)$$

where j is the current density, k is the sample region and P is the power.

15. The method according to claim 11 wherein determining a cell voltage includes determining an average cell voltage in the stack.

16. The method according to claim 11 wherein determining a cell voltage includes using the equation:

$$E_{cell} = E_{rev} - (j+a)*R_{HFR} - \left(0.07*\log_{10}\left(\frac{j+a}{j^0}\right) + c\log_{10}\left(1 - \frac{j}{j^\infty}\right)\right)$$

where $E_{cell}$ is the cell voltage, j is the current density, $R_{HFR}$ is the cell HFR resistance, $E_{rev}$, is the thermodynamic reversible cell potential, $\alpha$ is the background current density from cell shorting/cell crossover, $j^0$ is the exchange current density, $j^\infty$ is the limiting current density and c is the mass transfer coefficient.

17. The method according to claim 11 wherein separating a current density range of the fuel cell stack into a predetermined number of sample regions includes separating a current density range of 0.1-2.0 A/cm$^2$ into sample regions of 0.1 A/cm$^2$.

18. The method according to claim 11 wherein selecting a next sample region in the current density range includes selecting the next sample region in order from a low current density in the range to a high current density in the range.

19. The method according to claim 11 wherein estimating a polarization curve of the fuel cell stack using system parameters includes using different polarization curves depending on the life of the stack.

* * * * *